United States Patent

[11] 3,589,638

[72] Inventor Paul J. Ernisse
 Rochester, N.Y.
[21] Appl. No. 802,780
[22] Filed Feb. 27, 1969
[45] Patented June 29, 1971
[73] Assignee Eastman Kodak Company
 Rochester, N.Y.

[54] FILM-WINDING ASSEMBLY
 6 Claims, 6 Drawing Figs.
[52] U.S. Cl. .................................................... 242/71.3
[51] Int. Cl. .................................................... G03b 1/10
[50] Field of Search .......................................... 242/71.3,
 71.4, 71.5, 71.6

[56] References Cited
UNITED STATES PATENTS
3,082,971 3/1963 Miyauchi.................... 242/71.3

*Primary Examiner*—George F. Mautz
*Attorneys*—Robert W. Hampton and J. Addison Mathews ABSTRACT: A film winding assembly, for use in the film winding mechanism of a photographic camera or other device, comprises essentially three parts which can be molded from plastic material without machining. The parts can be simply and rapidly assembled into a camera film-winding mechanism without separate threaded or other locking elements, and, once assembled, the assembly cannot be disassembled from the exterior of the device. The assembly includes: 1) a manual winding member having first and second resilient latching fingers; 2) a bearing member adapted to be rotatably mounted in a housing wall of the device and having means engaged by the first latching fingers for latching the bearing member to the winding member; and 3) a locking member including means cooperative with the first and second latching fingers of the winding member for latching the locking member to the winding member and for preventing unlatching of the winding member from the bearing member. In the preferred arrangement disclosed, the locking member also includes a clutch element movable between a lowered position for engaging a corresponding clutch element on a film winding spool and a raised position for disengaging the spool clutch element.

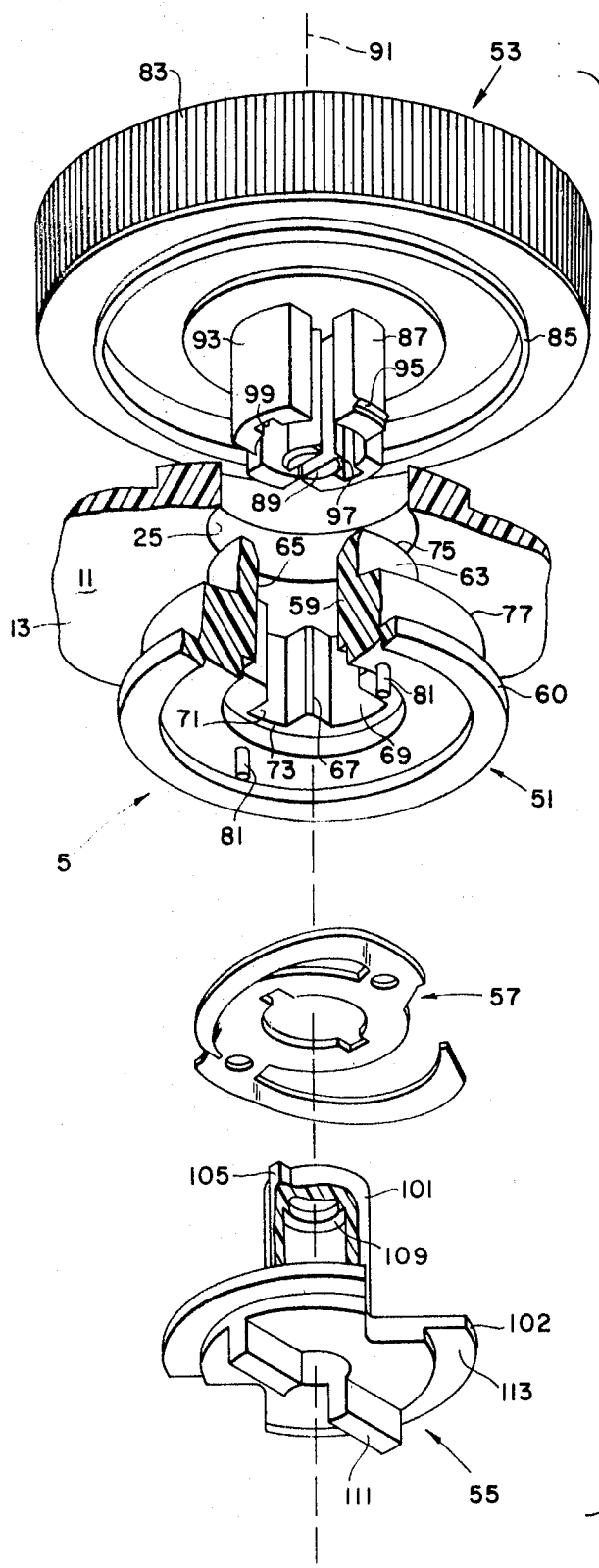
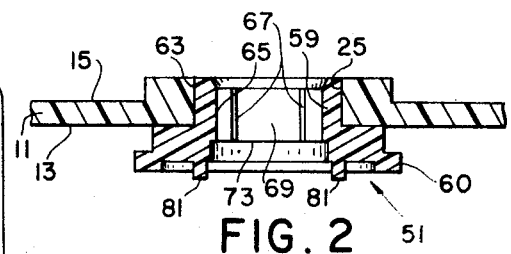
FIG. 2
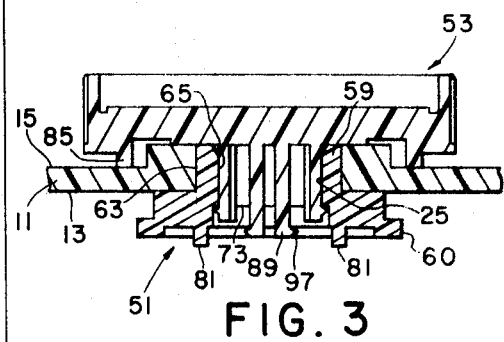
FIG. 3
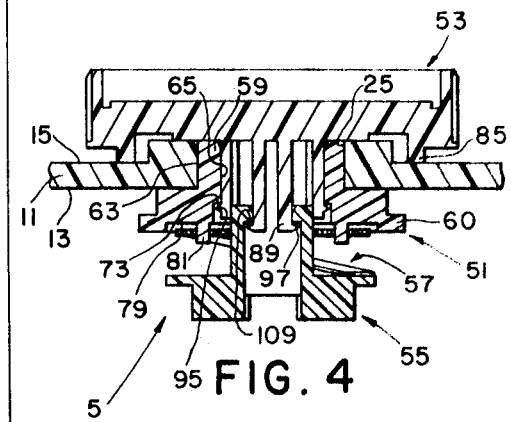
FIG. 4
FIG. 1
PAUL J. ERNISSE
INVENTOR.
BY
ATTORNEYS

PATENTED JUN29 1971

PAUL J. ERNISSE
INVENTOR.

BY / Addison Mathews

Robert W Hampton

ATTORNEYS

FILM-WINDING ASSEMBLY

BACKGROUND OF THE INVENTION

1. Field of the Invention

The present invention relates to a film-winding assembly and more particularly to an improved manual-winding knob assembly particularly adapted for use with the film-winding mechanism of a photographic camera or the like. Still more particularly, the present invention relates to a film-winding assembly consisting of easily assembled parts which can be constructed from moldable plastic material, and which, once assembled, cannot be disassembled from the exterior of the camera.

2. Description of the Prior Art

It is well know in the photographic art to design cameras which will accept film contained in cartridges of the type illustrated and described in commonly assigned U.S. Pat. Nos. 3,138,081 and 3,260,182, filed in the name of H. Nerwin and issued on June 23, 1964 and July 12, 1966, respectively. Such cartridges can be rapidly loaded into the camera, and include a film supply chamber and a film takeup chamber attached by an intermediate connecting portion. The connecting portion is provided with a film gate adapted to be aligned with the exposure aperture of the camera and, in order to permit successive winding of the film past the camera exposure aperture, the takeup chamber is adapted to receive a film takeup spool having a dog clutch accessible from the exterior of the cartridge.

The camera film-winding mechanism includes a dog clutch within the camera interior and a winding knob or lever accessible from the camera exterior. As illustrated, for example, in commonly assigned U.S. PAT. No. Re 26181, filed in the name of D. C. Harvey et al. and issued Apr. 4, 1967, the camera clutch is operatively connected to an exterior film-winding knob or lever and is adapted to be received in driving relationship with the dog clutch of the takeup spool. Thus, by manually rotating the winding knob or lever, the takeup spool can be rotated to thereby wind film onto the spool and advance the film past the exposure aperture of the camera.

As is also set forth in aforementioned U.S. Pat. No. Re 26,181, the camera clutch may be operatively associated with a latch for closing the camera back cover. In this manner the clutch may be raised or withdrawn from the cartridge chamber when the camera back is open, and lowered or extended into the cartridge chamber when the cover is closed. This arrangement permits insertion of the cartridge into the chamber without interference between the cartridge and the camera film-winding clutch.

Previously known film-winding mechanisms of the above type have been generally satisfactory in operation, but have been somewhat difficult to manufacture and assemble. This difficulty is due in part to the fact that such mechanisms generally include several parts which must be assembled and securely retained in their assembled relationships even when subjected to abuse by the camera operator. Moreover, the assembled parts have generally been maintained in their assembled relationship by separate fastening elements, such as screws or other threaded elements, and, while such fasteners are generally satisfactory for securely holding the parts together, they require a separate manufacturing and assembly operation and further require the molding or machining of threads on one or more of the parts.

Camera winding mechanism parts have also been secured together without separate fastening elements (as illustrated in U.S. PAT. No. 2,204,518 entitled SPOOL WINDING MEANS FOR CAMERAS and issued June 11, 1940) and by snap-type connections (as illustrated in U.S. Pat. No. 3,132,574 entitled AUTOMATIC TAKEUP DEVICE, issued May 12, 1964). However, these winding mechanisms are also difficult to manufacture or assemble and/or they do not securely prevent disassembly of the winding knob from the exterior of the camera.

Even further compounding the above manufacture and assembly problems is the fact that the camera clutch member preferably is movable as described above between retracted and extended positions, and the fastening elements must permit or provide for such movement.

SUMMARY OF THE INVENTION

It is an object of the present invention to overcome the above-noted disadvantages of prior film-winding assemblies and to provide an improved assembly which may be used in a photographic camera or the like.

In accordance with the present invention a knob or film-winding assembly is provided which is particularly adapted for use in the film-winding mechanism of a photographic camera or the like. The assembly is simple in design and easy to assemble. Moreover, the assembly can be manufactured from molded plastic parts which require no threaded or other separate securing means to hold the assembly together, and yet, once assembled, it cannot be disassembled from the exterior of the camera or the like.

In accordance with a preferred embodiment of the invention the winding assembly comprises a first member adapted to be received within the camera housing, a second member accessible from the exterior of the housing and having resilient latching means extending into engagement with the first member to releasably latch the first and second members together, and a third member cooperative with said first and second members to prevent resilient flexing of the latching means and thereby to prevent unlatching of the first and second members.

The invention, and its objects and advantages, will become more apparent in the detailed description of the preferred embodiments presented below.

BRIEF DESCRIPTION OF THE DRAWINGS

In the drawings:

FIG. 1 is an exploded perspective view of a winding knob assembly in accordance with the present invention, illustrating the various members of the assembly.

FIGS. 2, 3, and 4 are corresponding sectional views depicting one or more of the members of FIG. 1, and illustrating the ordered assembly steps involved in constructing a complete winding knob in accordance with the present invention.

DESCRIPTION OF THE PREFERRED EMBODIMENT

Figure 6:
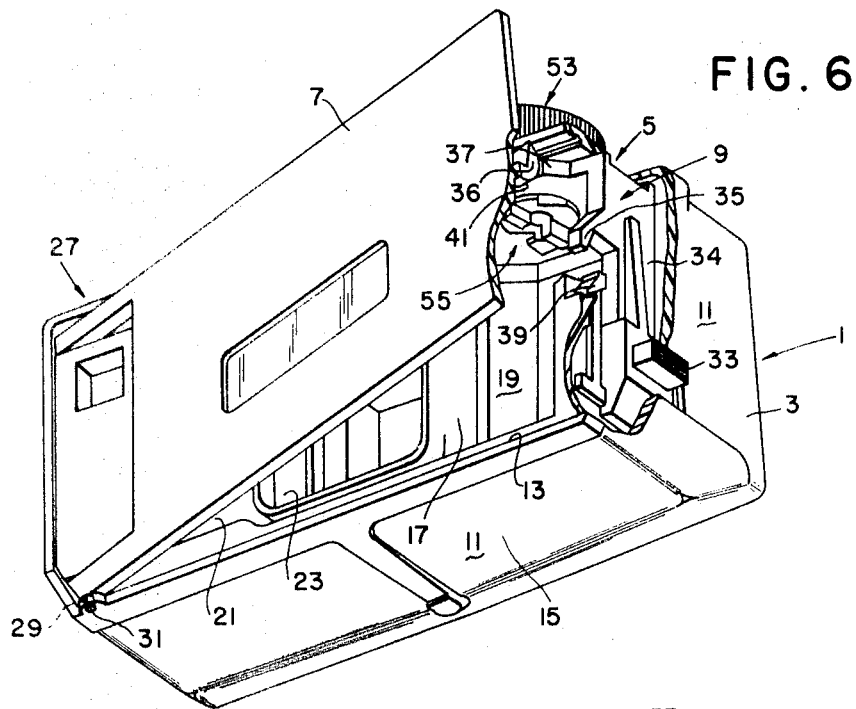
FIG. 6 is a perspective view of a photographic camera showing the winding knob assembly of FIG. 1 and further showing its relationship with a latching mechanism for latching the camera back and for moving a clutch member of the assembly between retracted and extended positions thereof.
Figure 5:
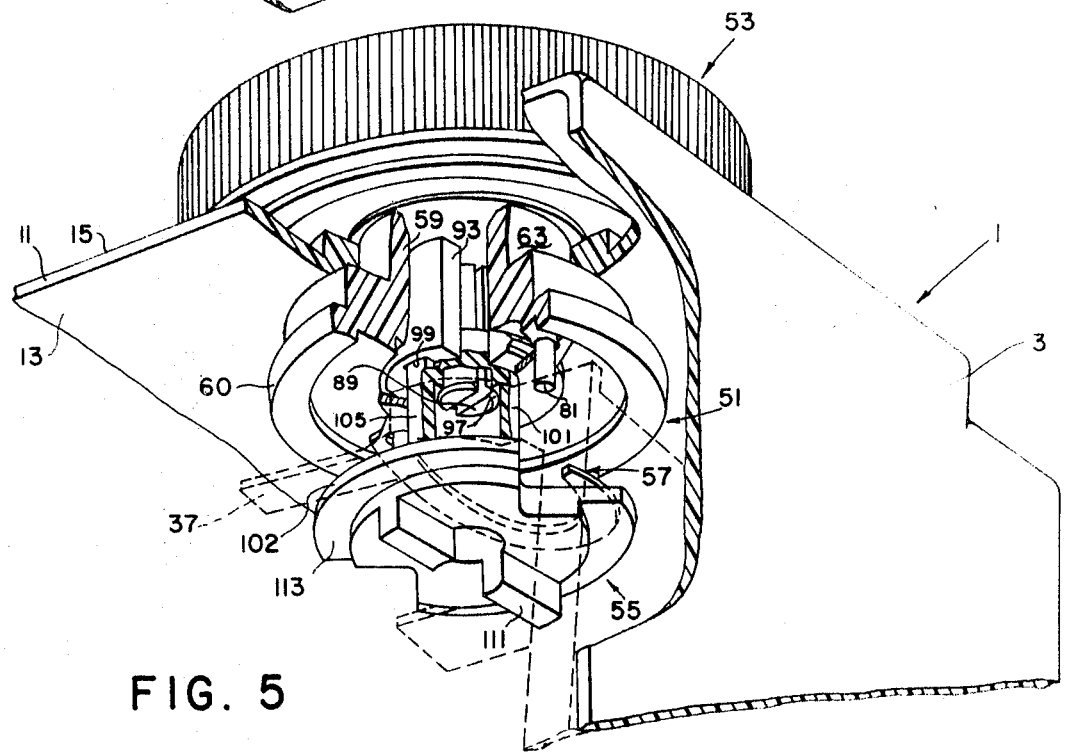
FIG. 5 is a perspective view showing the winding assembly in its assembled condition on the housing of a photographic camera.

Referring now to the drawings and particularly to FIGS. 5 and 6, a preferred embodiment of the present invention is disclosed in a camera 1 comprising a casing 3, a film-winding assembly 5, a rear cover member 7, and a latching mechanism 9.

Casing 3 houses the various camera elements in a manner well known in the art and comprises enclosure means such as walls 11 which define camera interior or inner surfaces 13 and camera exterior or outer surfaces 15. Inner surfaces 13 further define film cartridge receiving means 17 including takeup and supply recesses or chambers 19 and 21, and an intermediate or exposure area 23 between the chambers. Chambers 19 and 21 are adapted to respectively receive the takeup and supply portions of a film cartridge while exposure area 23 is adapted to receive the central portion of the cartridge and to cooperate with the cartridge gate to permit exposure of film in the cartridge by scene light passing through the camera objective. The above and further details of the cartridge and camera features cooperative therewith, are more fully described in aforementioned U.S. Pat No. 3,260,182.

In order to permit successive winding of film past the camera exposure area 23, the casing 3 is provided on a top surface thereof with means 25 defining an opening or bore through the casing and into takeup chamber 21. As will be more fully described hereinafter, a film-winding assembly is adapted to be received on the camera casing within this opening and cooperates with the takeup spool in the cartridge to advance film through the camera and past the exposure area 23.

The rear cover member 7 comprises a pivotally mounted door attached to the casing or wall 11 by hinge means 27, which hinge means has been illustrated as pins 29 on the cover member and corresponding recesses 31 in the camera casing 11. Hinge means 27 permits movement of the door from a closed position, wherein the camera interior is completely enclosed, and an open position permitting the insertion of a film cartridge into the camera as is well known in the art.

Latching mechanism 9 includes a release button 33 accessible from the exterior of the camera and operatively connected by a plate member 34 to both a camera-latching lug 35, adapted to engage a corresponding lug 36 on the cover member 7, and a yoke or forked end portion 37, adapted to engage the clutch member of the winding knob assembly as will be described in more detail hereinafter.

Release button 33, and the above-noted members associated therewith, are mounted in the casing 3 for movement between a lowered or latching position and a raised or release position. In the lowered or latching position of button 33, the camera-latching lug 35 engages corresponding lug 36 on cover 7 to maintain the cover in its closed position. In the raised or release position of button 33, on the other hand, the camera-latching lug 35 is disengaged from corresponding lug 36 on the cover to permit opening of the camera back. Moreover, a resilient abutment member 39, also operatively associated with the release button, engages a camming surface 41 on the cover member to resiliently urge the cover to a partially open position thereof where it can be grasped and further opened by the camera operator.

Referring now in more particular to the details of the present invention and to FIGS. 1—4, the camera film-winding assembly preferably comprises three separate parts of molded plastic construction and may also include a spring member stamped from sheet metal. These parts are received in the camera casing on opposite sides of opening 25 and may be easily and rapidly assembled into the complete unit shown in FIGS. 4 and 5. Moreover, the parts are constructed to cooperate in a locking manner upon assembly and, as will be described more fully hereinafter, they can be disassembled only in the reverse order to which they are ordinarily assembled. Since the last part to be assembled is on the interior of the camera, it should be apparent that the completely assembled unit and particularly the winding knob cannot be disassembled or removed from the exterior of the camera.

As illustrated in FIGS. 1—4, a preferred embodiment of the winding assembly 5 comprises a first and supporting or bearing member 51 adapted to be rotatably supported in opening 25 of wall 11; a second member or winding knob 53 received in the first member and accessible from the exterior of the camera; and a third and locking or clutch member 55 received in the second member and adapted to cooperate therewith to prevent separation of the first and second members. Additionally, the assembly may include a resilient or spring means 57 received between the first and third members to urge the third member toward an extended position thereof as will be described more fully hereinafter.

FIRST AND SUPPORTING OR BEARING MEMBER

The first and supporting or bearing member 51 includes a substantially cylindrical body portion 59 and a flanged or flared portion 60 adjacent one end of the body portion and extending radially outwardly therefrom. Body portion 59 defines an outer or bearing surface 63 having an outside diameter cooperative with the inside diameter of opening 25 to rotatably support the winding assembly in the camera casing. Body portion 59 also defines inner surfaces 65, including longitudinally oriented ribs 67 which outline and separate the inner surfaces of the body portion into aligning grooves or channels 69 and 71. These grooves or channels are adapted to receive corresponding means on the winding knob 53 for aligning and locating the winding knob relative to the bearing member as will be described more fully hereinafter in connection with the winding knob.

One end of the body portion 59 cooperative with or adjacent the flanged portion 60 is recessed or relieved to provide latching surfaces 73, while the other end of the body portion remote from flanged portion 60 is flattened to provide a locating surface 75. These latching and locating surfaces are adapted to cooperate with the winding knob 53 for purposes also to be described more fully hereinafter in connection with the winding knob.

The flanged portion 60 of bearing member 51 may be integrally molded or otherwise formed on the body portion and defines an upper surface 77 for engaging the wall 11, to longitudinally locate the bearing relative to casing 3, and a lower surface 79 including two stud members 81, for engaging and locating the spring member 57 relative to the bearing member.

SECOND MEMBER OR WINDING KNOB

The second member or winding knob 53 comprises an essentially flat disc-shaped member 83 having a lower surface 85 which cooperates with locating surface 75 of bearing member 51 to establish the longitudinal distance between flanged portion 60 of bearing member 51 and disc member 83. As illustrated in FIGS. 1 and 4, this longitudinal distance is substantially equal to the thickness of casing wall 11 adjacent opening 25 to prevent any play or loose fit between the film--winding mechanism and the camera housing.

Projecting from lower surface 85 of the winding knob are first and second groupings or sets of concentrically arranged members including resilient or flexible latching fingers 87 and 89 and somewhat stiffer guiding fingers 93. Latching fingers 89 are located radially outwardly of latching fingers 87, and are alternatively arranged relative to guide fingers 93. Moreover, as illustrated in FIGS. 1 and 4, both the outer fingers 87 and 93 and the inner fingers 89 comprise two members each, oriented in opposed relationship about an axis of rotation 91 of the winding mechanism.

The outer fingers 87 and 93 are configured on their exterior surfaces to mate respectively with cooperating surfaces 71 and 69 of bearing member 51, while the interior surfaces of outer fingers 87 and 93, as well as the exterior surfaces of inner fingers 89, are configured to cooperate with the locking member 55 as will also be more fully described hereinafter.

Provided at the ends of both the outer and inner latching fingers are cam or bevelled latching surfaces 95 and 97, respectively. Latching surfaces 95, on the outer fingers are adapted to cooperate with latching surfaces 73 on the bearing member to releasably latch or lock the winding knob to the bearing member. The latching surfaces 97 on the other hand, are adapted to cooperate with corresponding latching surfaces on the locking member as will be described more fully hereinafter.

THIRD AND LOCKING OR CLUTCH MEMBER

The third or locking member 55, like the bearing member 51 includes a cylindrical or body portion 101 and a flanged or flared portion 102. Body portion 101 defines an exterior surface 103, including longitudinally oriented ribs 105, configured to cooperate with the interior surfaces of the outer latching and guide fingers 87 and 93 to align and prevent relative rotation between the bearing member and the winding knob while permitting longitudinal movement therebetween as will be described more fully hereinafter.

The interior surfaces of body portion 101 are adapted to mate with the outer surfaces of the inner latching fingers 89 and include means defining latching surfaces or ledge portions 109 cooperative with the bevelled latching surfaces 97 of fingers 89 to releasably latch the locking member to the winding member.

Locking member 55 and particularly the flanged portion thereof further comprises a clutch or driving member including dogs 111 and abutment means illustrated as a stepped portion 113. Dogs 111 are adapted to drivingly engage a corresponding clutch member on a film takeup spool received in the camera takeup chamber while abutment means 113 is adapted to be engaged by yoke or forked portion 37 of the latching mechanism 9. As illustrated most clearly in FIGS. 5 and 6, clutch 111 and locking member 55 are mounted in the bearing member 51 for longitudinal movement between a lowered position (FIG. 5) for drivingly engaging the takeup spool and a raised position (FIG. 6) retracted from the takeup chamber. As is well known in the art, the clutch may be moved to the raised position (FIG. 6) in response to opening of the camera back and to its lowered position in response to closing of the camera back. This arrangement permits insertion of a cartridge into the chamber without interference between the camera and film-winding clutch.

A spring member 57 may also be provided between the locking or clutch member 111 and the bearing member 51 to resiliently urge the clutch to its lowered or extended position for engaging the takeup spool. However, since such springs are old in the art, further description thereof is considered unnecessary.

ASSEMBLY

Referring now to FIGS. 2—4 and to the manner in which the winding assembly is ordinarily assembled, the bearing member 51 is first inserted into opening 25 in wall 11 of the camera casing. As can be seen from FIG. 2, the outer bearing surface 63 of the bearing member is supported within the casing wall 11 for rotation relative thereto. Moreover, the upper surfaces of the bearing flanged portion 60 engage the lower surfaces of wall 11 to longitudinally locate the bearing member relative to wall 11.

After the bearing member 51 is located in wall 11, the winding knob 53 is placed on top of the bearing member and is rotated relative thereto until guiding fingers 93 and latched fingers 87 are aligned with their respective mating grooves 69 and 71 in the bearing member. At this time, the winding knob can be pushed downwardly into the bearing member until the lower surface of the winding knob engages the upper surfaces 75 of the bearing member. As the winding knob is pushed into the bearing member, the resilient or flexible latching fingers 87 will resiliently bend or flex inwardly until the latching surfaces 95 on the latching fingers clear the latching surfaces 73 on the bearing member, at which time the fingers will again return to their substantially unflexed position to thereby releasably latch the winding knob to the bearing member.

At this time in the assembly operation, the winding knob can still be removed or disassembled from the camera by simply exerting a separating force between the winding knob and the bearing member.

In the next assembly step, the locking or clutch member 55 is placed below the winding knob and bearing member and is rotated relative thereto until ribs 105 on the locking member are aligned in mating relationship with grooves 99 in the guide fingers 93 of the winding knob 53. At this time the locking member can be pushed upwardly with body portion 101 being received between the outer fingers 87 and the inner fingers 89. As the locking member is pushed upwardly, inner latching fingers 89 are flexed inwardly until the latching surfaces 97 on the fingers clear and latchably engage the latching surfaces 109 on the locking member. If it is desired to include a spring 57 in the assembly, this spring member may be positioned between the bearing member 51 and the locking member 55 just prior to the assembly of the locking member into the bearing member.

Upon inspection of FIG. 4, it should now become apparent that the winding assembly can only be disassembled in the reverse order to that set forth above. Thus, while it is still possible to disassemble the winding assembly from the interior of the camera by first removing the locking member 55, it is not possible to disassemble the winding assembly from the exterior of the camera. This is due to the fact that once the locking member 55 has been inserted into the winding member 53, the outer surfaces of body portion 101 are received in engagement with the inner surfaces of latching fingers 95. This engagement prevents resilient bending or flexing of the outer latching fingers 87 and thereby prevents release of the winding knob from the bearing member.

While a preferred embodiment of the present invention has been described above, it should now be apparent that the principles of the present invention could also be applied to an assembly wherein the bearing member 51 is securely received in or formed as a part of the housing wall 11. In this case, the winding knob 53 could be rotatably received within the bearing member to provide for winding of the takeup spool in a manner similar to that described above.

The invention has been described in detail with particular reference to preferred embodiments thereof, but it will be understood that variations and modifications can be effected within the spirit and scope of the invention.

I claim:

1. A film-winding assembly for a photographic device having a housing and means defining an opening in the housing, the assembly comprising:
    a first member adapted to be received substantially within the housing adjacent the opening, said first member having means defining a latching surface;
    a second member adapted to be received substantially without the housing adjacent the opening, said second member having resilient latching means extending into the housing through the opening and into engagement with said latching surface of said first means to latch the first and second members together on opposite sides of the housing; and
    a third member cooperative with said first and second members to prevent flexing of said resilient latching means and to thereby prevent unlatching of said first and second members.

2. A rotatable film-winding assembly for a photographic camera having a support wall and means defining an opening in the support wall, the assembly comprising:
    first and second separable members mounted in the camera on opposite sides of the support wall, said first member including means defining a first latching surface, said second member including a first resilient latching means engageable with said first latching surface to releasably latch said second member to said first member, said second member also including a second resilient latching means; and,
    a third member having means defining a second latching surface engageable by said second latching means to releasably latch said third member to said second member, said third member cooperating with said first latching means to prevent unlatching of the first member from the second member when said third member is latched to said second member.

3. A film-winding assembly as claimed in claim 2 wherein the camera has a rotatable film takeup spool and the third member includes a clutch member engageable with the takeup spool to rotatably drive the same.

4. A film-winding assembly comprising:
    a winding member having first and second pairs of resilient latching fingers;
    a bearing member having means defining a first latching surface engageable by said first pair of resilient latching fingers to releasably latch said winding member to said bearing member; and, a locking member having means defining a second latching surface engageable by said second pair of resilient latching fingers to releasably latch said winding member to said locking member, said locking member preventing unlatching of said winding member from said bearing member.

5. A winding assembly for a photographic camera or the like comprising:
   a winding member having first resilient latching fingers and second resilient latching fingers spaced adjacent said first latching fingers;
   a support member having means engageable with one side of said first latching fingers to releasably latch said support member to said winding member; and,
   a locking member having means engageable by said second latching fingers to releasably latch said locking member to said winding member, said locking member including locking means engageable with the other side of said first latching fingers to prevent unlatching of said support member from said winding member.

6. A film-winding mechanism for a camera having a rotatable film takeup spool, said mechanism comprising:

a manual winding member accessible from the exterior of the camera and having first and second sets of resilient latching fingers located adjacent each other on the winding member and extending outwardly therefrom;
a bearing member rotatably mounted on the camera and having means defining first surfaces engageable by said first set of latching fingers to releasably latch said winding member to said bearing member and to prevent relative rotation between said winding member and said bearing member; and
a locking member having means defining second surfaces engageable by said second set of latching fingers to releasably latch said locking member to said winding member and to prevent rotation between said locking member and said winding member, said locking member including a portion receivable between said adjacent sets of latching fingers to prevent unlatching of said winding member from said bearing member when said locking member is latched to said bearing member, said locking member also defining a clutch engageable with the film takeup spool to rotatably drive the same.